United States Patent Office 3,504,400
Patented Apr. 7, 1970

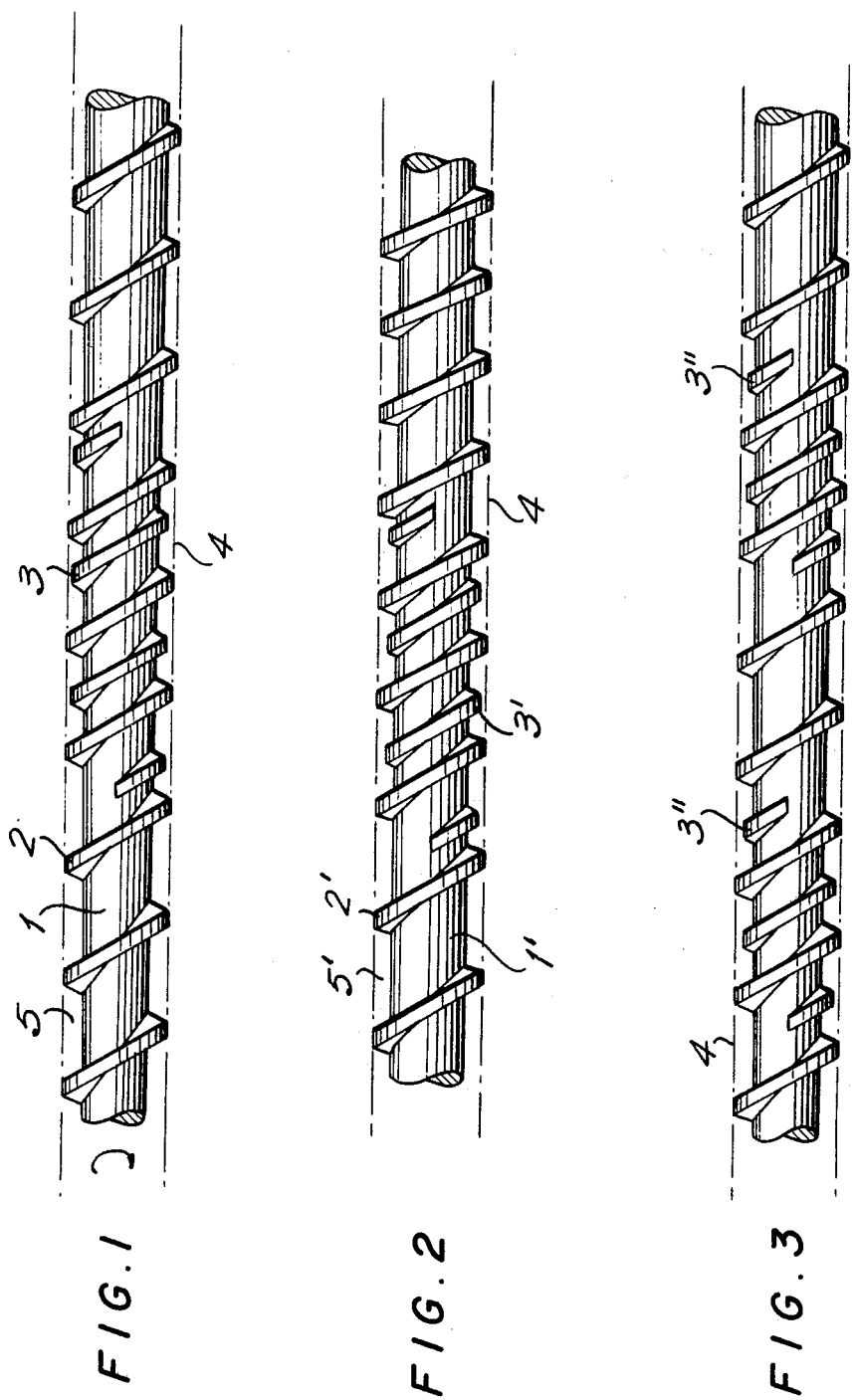

3,504,400
SESQUITHREAD FEED WORM FOR AN EXTRUDER
Miltcho Angelov Natov and Evtim Nikolov Evtimov, Sofia, and Stefan Todorov Bankov, Pleven, Bulgaria, assignors to Vish Chimiko-Technologitsheski Institut, Sofia-Darvenitza, Bulgaria
Filed Oct. 23, 1967, Ser. No. 677,171
Int. Cl. B29f 3/02
U.S. Cl. 18—12    7 Claims

ABSTRACT OF THE DISCLOSURE

An extruder worm having a main helical rib of variable pitch or depth to define an extrusion channel with an extruder body, an additional rib being interwound with the main rib to extend into the channel.

BRIEF SUMMARY OF THE INVENTION

The present invention relates to extruders and particularly to improved feed worms for extruders.

The fundamental requirements of modern extruders is that they have high plasticizing capacity, that they be capable of uniformly homogenizing the material and that they have high productivity. In order to achieve a high plasticizing capacity, different types of worm extruders are known. They are usually combinations of different geometrical shapes such as eccentric plates, perforated discs, interrupted and continuous helical threads, and other diverse bodies for alternating the direction of the flow in a helical channel.

In the hitherto known constructions the increase of the working compression of the material to be extruded is achieved by reducing the size of a helical channel from an inlet towards an outlet of the feeding worm. The restriction of the reverse flow at high compression is obtained usually by increasing the length of the dozing zone. This leads, however, to the increase of the total length of the feeding worm and therefore to a number of difficulties as regards its support, construction, maintenance, etc. as well as resulting in an increase of the cost of the extruder.

The shortcomings of these feed worms is their very complicated construction, and therefore their difficult production. In addition their operation is not satisfactory.

An object of the present invention is to eliminate these shortcomings and to provide a feed worm for extruders, characterized by satisfactory plasticizing and homogenizing properties, high capacity due to reduction of reverse flow, stable working conditions and relatively simple construction.

The invention is based on the concept, that the required high working pressure, and concurrent increased capacity of an extruder can be achieved not only by reducing the total depth of the helical channel, but also by introducing an equivalent resisting element in the helical channel, which is adapted to reduce the reverse flow of the extruded materials without any substantial influence on the direct forced flow.

The additional resistance element may be a resisting rib which is interwound with a main helical rib and has a pitch and a height different from that of the main helical rib. Such worms will be referred to hereafter as "sesquithread worms" and these differ from the hitherto known worms by the provision of the additional thread or rib which serves not to separate the molten from the non-molten material but primarily to constitute a resistance to the reverse flow of the plasticized material. Therefore the additional rib is not connected to the main rib. This is very efficient from a technological point of view since it results in easy manufacturing and makes for the versatility of the resistance rib.

Depending on the requirements of the application of the worm, the additional resistance worm or rib may be designed with a pitch either larger or smaller than that of the main rib. In addition, several resistance ribs can be provided along the length of the worm.

BRIEF DESCRIPTION OF THE DRAWING

FIGURES 1–3 are side views of respective embodiments of a worm according to the invention.

DETAILED DESCRIPTION

In the drawing are shown several embodiments of sesquithread worms according to the invention. Similar elements common to the various embodiments will be given the same numeral deisgnations.

In FIG. 1, there is shown a sesquithread worm which comprises a shank 1 having a main helical rib or thread 2 wound thereon. The shank 1 is tapered to gradually vary in diameter lengthwise of the worm. An additional rib 3 is interwound with the main rib on the shank 1. The additional rib 3 extends only along a portion of the length of the main thread 2.

The worm is rotatably mounted within a body 4 and the threads 2 bound a channel 5 of helical form. The shank 1 increases in diameter from the inlet of the worm which is at the left side of FIG. 1, to the outlet of the worm which is at the right side of FIG. 1 whereby the channel 5 diminishes in size in this direction. Consequently, as worm 1 rotates, the material in channel 5 is constrained to move to the right during which time, it undergoes increased compression due to the diminution in size of the channel. The additional rib 3 projects into the helical channel 5 to act as a resistance element to the reverse flow of the extruded material. The rib 3 is spaced from the internal surface of body 4 so as not to close the channel whereby the rib 3 exerts relatively little influence on the direct forced flow of the material.

In FIG. 2, there is shown a modified arrangement wherein the variation of the size of channel 5' is obtained by diminishing the pitch of main helical rib 2' and maintaining the diameter of the shank constant. The additional rib 3' is interwound with the main rib 2' on the shank 1' in a manner similar to that in FIG. 1. It is to be noted that the pitch of the additional ribs 3 and 3' in FIGS. 1 and 2 are respectively different from the pitch of the main ribs 2 and 2'. As shown, the pitch of the additional ribs is greater than that of the main ribs and this has the advantage of varying the position of the additional rib in the extrusion channels. This promotes homogenity.

As shown in FIG. 3, more than one additional resistance rib 3" can be provided along the length of the worm, thereby increasing the resistance to reverse flow of the extruded materials while offering little influence on the direct force flow. Although the additional rib has been shown in FIG. 3, on a worm of the type shown in FIG. 1, it is clearly evident that such additional ribs can be provided on other worm embodiments and in particular, on the embodiment shown in FIG. 2.

The sesquithread worms according to the invention are relatively easy to produce inasmuch as the main rib and additional rib are independent of one another and therefore can be easily machined.

Numerous modifications and variations of the disclosed embodiments of the invention will now become evident to those skilled in the art which will be within the spirit and scope of the invention.

What is claimed is:

1. An extruder worm adapted for being received in an extruder body and comprising a shank, a main helical rib wound on said shank, said worm cooperating with said body to define a helical channel for the extrusion of material, which channel diminishes in size lengthwise of the worm, and an additional rib, independent of said main rib, and extending into said channel, said additional rib having a different pitch than that of the main rib and a lesser height there than as measured from said shank.

2. A worm as claimed in claim 1 wherein said main rib has a constant pitch and outer diameter, said shank being tapered.

3. A worm as claimed in claim 1 wherein said main rib has a variable pitch whereby the channel size diminishes.

4. A worm as claimed in claim 1 wherein said additional rib is interwound with the main rib.

5. A worm as claimed in claim 1 wherein said additional rib has a pitch which is greater than that of the main rib.

6. A worm as claimed in claim 1 wherein said additional rib has a length which is less than that of the main rib and is disposed at an intermediate location along the length of the main rib, said additional rib blending at its ends with the shank.

7. A worm as claimed in claim 1 comprising at least one further additional rib in said channel.

References Cited

UNITED STATES PATENTS

| | | | |
|---|---|---|---|
| 1,886,592 | 11/1932 | Royle | 18—12 |
| 3,160,916 | 12/1964 | Blakey | 18—12 |

WILLIAM J. STEPHENSON, Primary Examiner

U.S. Cl. X.R.

18—12